United States Patent [19]

Brine

[11] Patent Number: 4,784,355
[45] Date of Patent: Nov. 15, 1988

[54] FLAP SYSTEM FOR SHORT TAKEOFF AND LANDING AIRCRAFT

[75] Inventor: Gerald T. Brine, La Palma, Calif.

[73] Assignee: The United States of America as represented by the Secretary of the Air Force, Washington, D.C.

[21] Appl. No.: 928,350

[22] Filed: Nov. 10, 1986

[51] Int. Cl.[4] .............................................. B64C 3/50
[52] U.S. Cl. ..................................... 244/213; 244/216
[58] Field of Search ............... 244/213, 214, 215, 216, 244/218, 219

[56] References Cited

U.S. PATENT DOCUMENTS

| | | | |
|---|---|---|---|
| 2,261,363 | 11/1941 | Griswold, 2d | 244/90 |
| 2,405,726 | 8/1946 | Zap | 244/216 |
| 3,478,988 | 11/1969 | Roed | 244/42 |
| 3,767,140 | 10/1973 | Johnson | 244/42 DA |
| 3,874,617 | 4/1975 | Johnson | 244/42 DA |
| 4,120,470 | 10/1978 | Whitener | 244/213 |
| 4,248,395 | 2/1981 | Cole | 244/216 |
| 4,405,105 | 9/1983 | Dilmaghani et al. | 244/216 |
| 4,434,959 | 3/1984 | Ruldolph | 244/215 |

FOREIGN PATENT DOCUMENTS

| | | |
|---|---|---|
| 838625 | 9/1939 | France . |
| 1568250 | 5/1980 | United Kingdom . |

OTHER PUBLICATIONS

*Aviation*, "New Type Flaps Lower C-74 Landing Speed", Nov. 1945, pp. 150-151.

*Primary Examiner*—Galen Barefoot
*Attorney, Agent, or Firm*—Donald J. Singer; Jacob N. Erlich; Jules J. Morris

[57] ABSTRACT

A flap system for deploying high lift flaps on short takeoff and landing aircraft. The flap system utilizes an activating mechanism 27 that is used to extend a flap 12, a vane 22 and a spoiler 18 for maximum lift. The mechanism 27 utilizes relatively few linkage pieces and attached to the flap at single pivot points 44. The flap is supported by an actuator 46 and flap hinge support bracket 30. Increased mechanism rigidity and single pivot mountings allow use of roller 75 and track 74 guides at flap ends 78, 80 to smoothly guide flap movement and provide a fail-safe in case of pivot mounting failure. Spherical bearings 86 are utilized for mounting of rollers 75 and actuators 46, 60 in order to compensate for misalignment of the flap 12 and the flap mechanism 27 when used with tapered flaps on swept wing aircraft. The spoiler 22 is joined by a guide link 62 that adjusts spoiler position with flap 12 movement in order to maximize lift. The spoiler can also be used conventionally by activation of actuator 60.

17 Claims, 4 Drawing Sheets

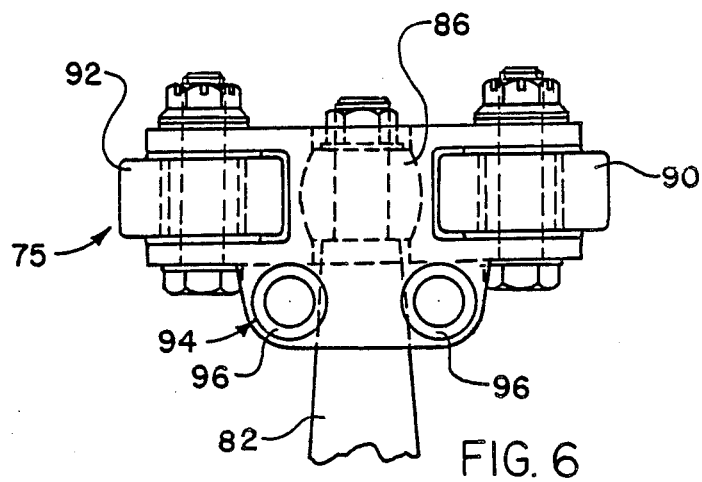
FIG. 6
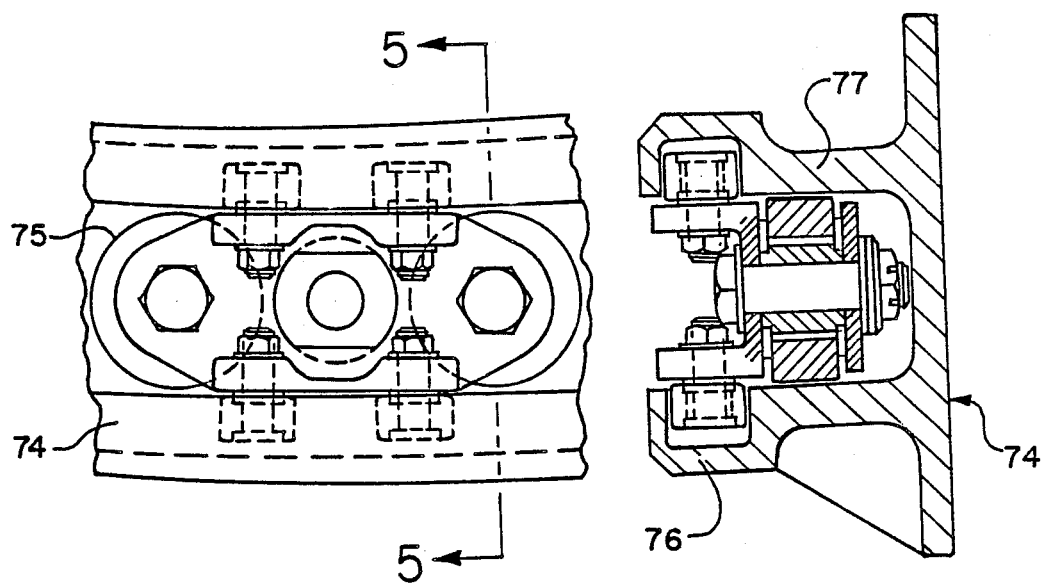
FIG. 4
FIG. 5

FLAP SYSTEM FOR SHORT TAKEOFF AND LANDING AIRCRAFT

STATEMENT OF GOVERNMENT INTEREST

The invention described herein may be manufactured and used by or for the Government for governmental purposes without the payment of any royalty thereon.

TECHNICAL FIELD

This invention relates to high lift flaps for large aircraft and particularly a high lift flap and spoiler arrangement for a short takeoff and landing aircraft.

BACKGROUND

An area of continuing research in aircraft design stems from the desire to decrease the minimum landing and takeoff distances of aircraft. Many remote locations are inaccessible to relatively large aircraft due to economic circumstances for physical geography which prevent construction of conventional landing fields. Thus a need has always existed for providing relatively large aircraft that are capable of taking off and landing in confined locations.

Since the 1940's a variety of aircraft have been developed with means for directing airflow downwards in order to increase lift at low air speeds. One way of increasing aircraft lift is to provide trailing edge wing flaps that are deployed at takeoff and landing in order to extend aircraft wing surface. These trailing edges flaps need to be of considerable size on larger aircraft to successfully increase lift. Such large trailing edge flaps require substantial linkages for their support and to control their motion during flight.

An example of linkages used with trailing edge wing flaps on short takeoff and landing aircraft can be found in U.S. Pat. No. 3,874,617 to Johnson. The Johnson device discloses a double four bar linkage for flap actuation with an interconnecting linkage for deflecting the spoiler as the flap is extended. The spoiler thus serves as a third flap with its downward deflection proportional to flap extension at takeoff and landing. The Johnson device has proven to be an adequate mechanism and an improvement in the art for small to medium size aircraft.

Several problems arise, however, when trying to adapt the Johnson linkage to a larger cargo or passenger aircraft. A significant problem is due to insufficient rigidity. This type of multipiece linkage lacks sufficient rigidity to control flap movement and vibration in larger aircraft. As a large flap is deployed from a swept wing aircraft the inboard and outboard ends of the flap move away from the wing at varying rates due to the aerodynamically dictated variation in flap size with increasing distance from the fuselage. This requires such linkages to move sideways during extension of the flap and as a result multipiece linkages cannot be made rigid for this application. In order to accommodate such sideways movement without bending a relatively large amount of play (looseness) is allowed in the linkage. Typically, several linkages are used to move the flap. Play in the linkages results in substantial wear and increases maintenance work due to uncontrolled movement and chaffing between parts.

Another aspect of short takeoff and landing aircraft design to be considered is use of high lift flaps in redirecting the engine exhaust thrust. The flap must therefore be strong enough to withstand the impact of engine thrust without sustaining damage or jamming.

In view of the above a need exists for a means of providing an adjustable flap system for large aircraft capable of withstanding increased load requirements due to increased aircraft weight and the application of engine thrust. This need implies a further need for increased flap rigidity to reduce flap maintenance and structural wear.

In view of the above it is object of this invention to provide an improved trailing edge flap system for relatively large short takeoff and landing (STOL) aircraft.

SUMMARY OF THE INVENTION

The invention comprises a flap system for the trailing edge of a swept aircraft wing. The system includes flap supports which are fixedly mounted to the trailing edge of the wing and a wing flap having inboard and outboard ends that is pivotably mounted to the flap supports. Typically, several flap supports are mounted to the trailing edge of the wing and the flap is mounted at a single point to each of said flap supports. Flap actuators are pivotably mounted from the flap supports to the wing flap and are used to adjust flap position relative to the aircraft wing.

In the preferred embodiment of the invention a vane is fixedly attached to the wing flap for coordinated movement therewith. When the flap is deployed a flow passage if formed between the vane and the flap which permits air from under the wing to flow over the flap in order to increase lift.

A further element of the preferred embodiment of the invention comprises a spoiler pivotably attached to the wing support. A spoiler actuator is pivotably attached to the spoiler for independent actuation of the spoiler. Further, a link member pivotably connects the flap to the spoiler actuator. This link member coordinates spoiler movement with flap movement in order to utilize the spoiler as an element of the flap to increase lift. When the flap is deployed an airflow passage is formed between the spoiler and the vane to increase airflow over the top surface of the flap and thereby increase lift.

In a preferred embodiment of the invention the link member is connected to a crank which proportionates spoiler movement with that of the flap. The spoiler, however, can be actuated independently to enhance aircraft breaking.

Yet another aspect of the present invention comprises a track and roller assembly interposed between the flap and the aircraft wing. The track and roller assembly stabilizes and controls flap movement and increases flap rigidity relative to the aircraft wing. Preferably, the track and roller assembly comprises inboard and outboard tracks assembled to the wing flap and roller assemblies attached to the aircraft wing such that the roller assemblies roll within the tracks during wing flap movement. The roller assemblies are spherically mounted to the wing in order to insure roller alignment within the tracks.

BRIEF DESCRIPTION OF THE DRAWINGS

The foregoing and other objects and advantages of the invention will be apparent from the following more particular description of the preferred embodiment of the invention, as illustrated in the accompanying drawings, in which like reference characters refer to the same parts throughout the different views. The drawings are not necessary to scale, emphasis instead being placed upon illustrating the principles of the invention.

FIG. 4 is a top view of a roller in a track used with the flap of FIGS. 1-3;

FIG. 5 is a cross-sectional view taken along line 5—5 of FIG. 4; and

FIG. 6 is a side view of the roller of FIG. 4.

DETAILED DESCRIPTION OF THE INVENTION

Figure 1:
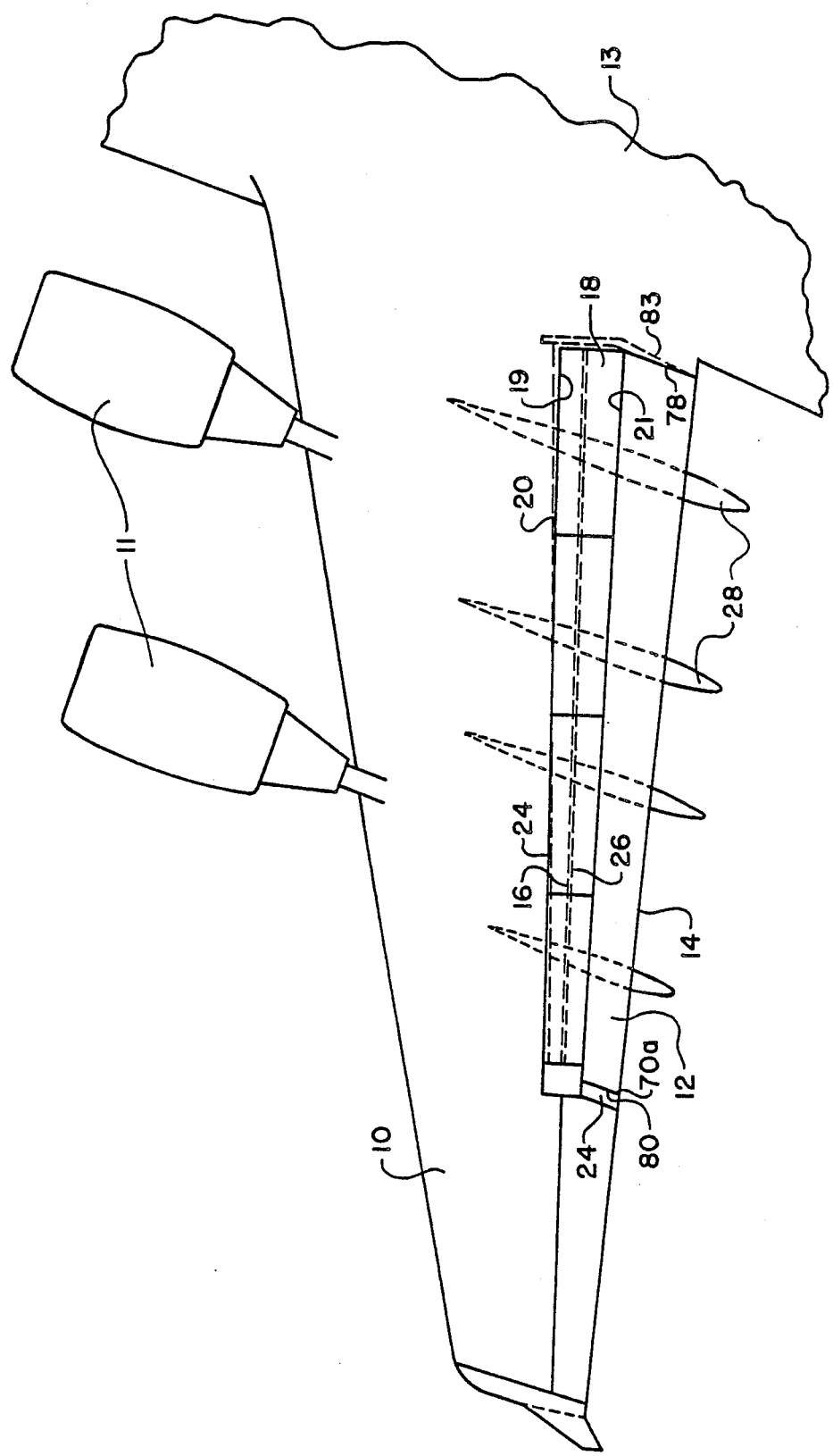
FIG. 1 is a top view of an aircraft wing having a flap system incorporating the principles of this invention.

FIG. 1 shows the wing 10 of a relatively large short takeoff and landing (STOL) distance aircraft having a flap 12 spanning most of the wing length. FIG. 1 also shows the relative positions of the flap 12, aircraft engines 11 and aircraft fuselage 13. The flap is in its fully retracted position in FIG. 1.

The flap 12 has a trailing edge 14 and a leading edge 16 (hidden in the view of FIG. 1 and shown by dotted lines). The flap 12 is extended away from wing 10 during landings and takeoffs to increase aircraft lift at low air speeds.

A spoiler 18 extends from wing trailing edge 20 to overlap a portion of flap 12. The leading edge 19 of the spoiler 18 is adjacent to the wing 10 and the trailing edge 21 is adjacent to the top surface of flap 12. As will be detailed below, the spoiler is used in conjunction with the flap to provide extra lift and minimize landing and takeoff distances.

A vane 22 also forms a part of the flap system. The vane 22 is hidden beneath the spoiler 18 in FIG. 1, however, the leading 24 and trailing 26 edges of the vane are shown in dotted lines. The vane 22 is shown in cross-section in FIG. 2. Vane 22 moves with the flap 12 in order to add lift by forming a double slotted flap system with the flap and the spoiler 18 (shown in FIG. 3).

Figure 2:
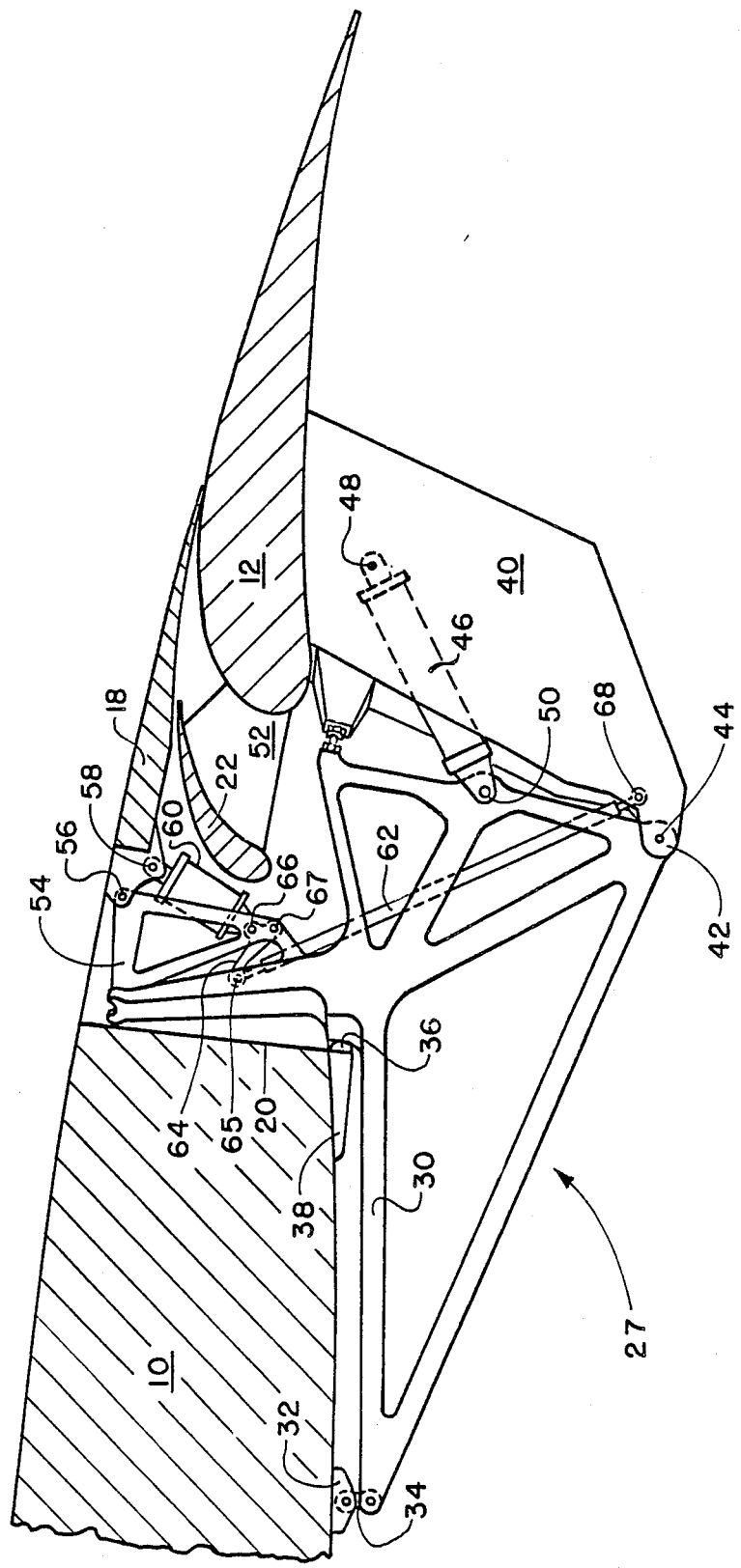
FIG. 2 is a partially cross-sectioned pictorial side view of a flap and flap control mechanism incorporating the principles of this invention.
Figure 3:
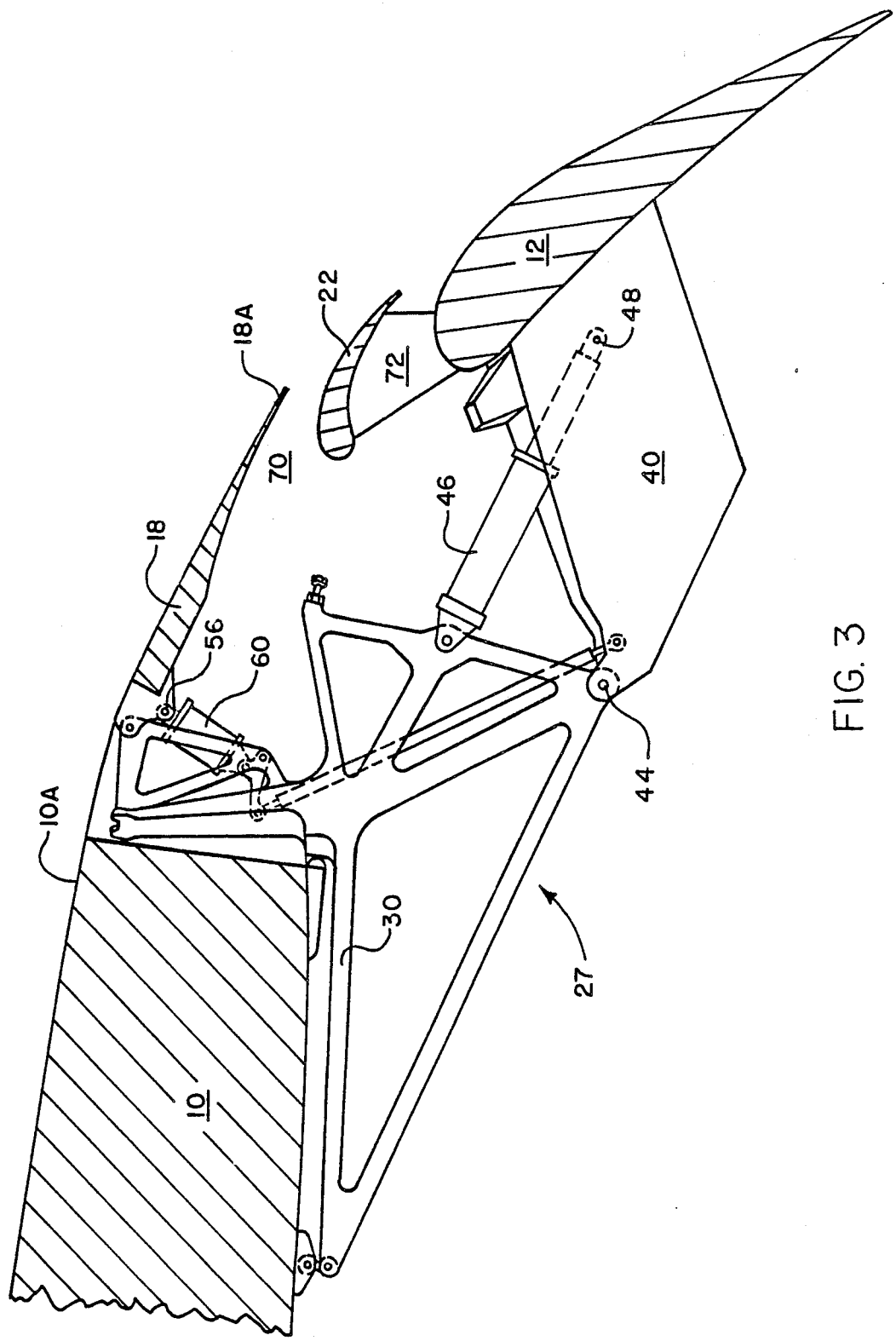
FIG. 3 is a partially cross-sectioned pictorial side view of the flap system of FIG. 2 with the flap deployed to increase aircraft low speed lift.

The flap and spoiler system is actuated by four nearly identical mechanisms (FIG. 2) hidden in fairings 28. The four mechanisms incorporate the principles of this invention and a representative mechanism is shown in detail in the cross-sectional views of FIGS. 2 and 3. FIG. 2 shows a mechanism 27 for flap actuation in its retracted position, while FIG. 3 presents the same mechanism in its extended position with the flap deployed.

A flap hinge support bracket 30 which forms the foundation of the flap support mechanism 27 (FIG. 2) is fixedly attached to the wing 10. The support bracket 30 has a first attachment point comprising a pad 32 and link 34 positioned nearly midway on the underside of the wing 10. Closer to the wing trailing edge 20 is a second attachment point at bracket flange 36. Typically, a nut and bolt assembly extends from flange 36 through a pad 38 on wing 20 to secure the support bracket 30.

The flap 12 is pivotably mounted to the flap hinge support bracket 30 by means of a flap bracket 40 which connects to the hinge support bracket 30 at pivot joint 42. A pivot hinge 44 is formed by a rod or other means; flap 12 therefore may pivot around pivot hinge 44.

The flap bracket 40 is also attached to the hinge support bracket by means of an hydraulic actuator 46. The hydraulic actuator 46 is pivotally attached at one end by a spherical mounting to the flap bracket 40 which forms an internal clevis at attachment point 48. At its other end the actuator is pivotably attached by a spherical mounting to the hinge support bracket at pivot point 50. Extension of actuator 46 pivots the flap 12 clockwise around pivot point 44, as is graphically shown in FIG. 3.

The vane 22 is fixedly attached to the flap by means of a series of vane brackets 52. Clockwise movement of flap 12 also causes a similar movement of vane 22.

Spoiler 18 is attached to wing 10 to produce spoiler operation coinciding with flap movement in order to increase lift, however, the standard spoiler breaking functions are also retained. A spoiler support is formed from an extension 54 of hinge support bracket 30. The spoiler 18 is pivotably attached to the hinge bracket extension 54 at pivot point 56. The spoiler is also attached at pivot point 58 to a spoiler actuator 60. The spoiler actuator connects with a movable mount 66 for coordinating spoiler movement with flap movement.

A link 62 connects the flap bracket 40 at clevis point 68 with the spoiler actuator 60 through crank 64. The topmost portion of the link is connected to the crank 64 at pivot connection 65. The crank pivots about pivot 67 on the hinge bracket extension 54 and forms the moveable actuator mount 66. Movement of the flap 12 in the clockwise direction (extended) pulls down the link 62 which produces counter clockwise movement of crank arm 64. The moveable mount 66 therefore moves with the crank arm 64 and pulls down actuator 60 resulting in clockwise movement of spoiler 18 around pivot point 56 that coincides with flap movement.

The view of FIG. 3 shows the flap and spoiler in their maximum lift position. The flap as shown in FIG. 3 is deployed to generate the maximum lift across the aircraft wing on landing or take-off, as a result, the aircraft can travel at reduced speed without aerodynamic stall.

Use of the spoiler as part of the flap system provides for a double slotted flap system. This increases lift by directing air from under the wing to the top surfaces of the vane 22 and flap 12. Two airflow channels are formed between the spoiler, the vane and the wing for this purpose. Airflow channels 70 and 72 direct high velocity air from under wing 10 over the long top surfaces of flap 12 and vane 22 to decrease air pressure and increase lift. The passage of this air also helps prevent air flow separation across the combined wing and flap top surface which otherwise might reduce lift.

In the view of FIG. 3, spoiler 18 is performing a vital function by extending the top surface 10A of wing 10 and providing channel 70 between the vane and the wing. The spoiler 18 can also be used in a conventional manner. Extension of actuator 60 causes the spoiler to pivot counter-clockwise about pivot point 56. This results in the spoiler tip 18A being raised above the wing surface 10A to decrease lift and act as a speed break. On landing, use of the spoiler as a speed break results in negative pressure loads across the wings. This loads up the aircraft brakes and increases breaking effectiveness. The spoiler 18 can also be used one wing at a time for directional control at relatively low air speeds.

The mechanism 27 for the flap and spoiler system discussed above has fewer linkage pieces and therefore has substantially increased rigidity over conventional mechanisms for similar large flaps. This increased rigidity enables the flap to be used for redirecting engine exhaust downward to add additional lift for short take-offs and landings. Referring to FIG. 1, it can be seen that aircraft engine (11) exhaust flows underneath the wing 10 so that flap 12 is in the engine exhaust airstream when deployed.

Another aspect of this invention is that the single pivot (44) mounting of the flap allows for tight flap movement control. Since the flap rotates about a single point pivot it is possible to mount a track 74 and roller 75 system on the flap to direct smooth flap movement and provide a fail-safe for the primary hinge mounting detailed above. The track and roller system comprises tracks mounted at the end of the flap within which wing mounted rollers 74 are positioned. This is can be more readily understood with reference to FIGS. 4 through 6.

The tracks are typically mounted at each end of flap 12. An inboard track is mounted at flap end 78 (FIG. 1) and a slightly smaller outboard track is mounted at flap outboard end 80 (FIG. 1). FIG. 4 partially shows a typical semi-circular track 74 for assembly to a flap end within which a roller assembly 75 is positioned for controlled movement. The track is shown in cross-section in FIG. 5. The track comprises a well area 77 which controls roller movement from side to side and a flange capture area 76 which controls up and down roller movement. The roller assembly 75 can therefore only move in the permitted direction along track 74 and between conventional stops at the end of the track. The stops are typically metal mounts which block the ends of the track area formed by track portions 76 and 77.

FIG. 6 shows a detailed view of a roller assembly 75. The roller assemblies 72 are mounted on the wing to roll within the tracks at the end of the flap. Attachment rods 82 are mounted to the flap at inner position 83 and outer position 84. The roller assemblies are spherically mounted to the attachment rod 82 by means of spherical bearings 86. These spherical bearings are similar to the spherical bearings placed at both ends of each actuator to compensate for sideways shifts. The other end of the attachment rod 82 may also require a spherical bearing mount where it joins the flap. The spherical bearings 86 make for perfect alignment of the roller assemblies with the tracks 74 for all allowable flap locations.

Two sets of rollers are included with each roller assembly to control roller movement within the track. The lower roller set is made up of rollers 90 and 92 whicdh roll in well area 77 of the track to control side movement. The upper roller set 94 comprises four rollers 96 which run in capture flange area 76 and control vertical movement of the roller assembly.

The combination of the roller and track assemblies with the rigid pivot mechanism of FIGS. 2 and 3 makes for a fail-safe flap actuation system that provides for smooth flap movement. The tracks act as fail-safes in the unlikely event of a hinge joint failure. Track and roller assemblies prevent misalignment of the flap during such a failure and prevents possible aircraft control problems. Further, this strong flap assembly is fully capable of withstanding the stresses created by the engine exhaust stream impinging upon the flap at high engine power levels.

The mechanism as a whole solves the problem of designing relatively large flaps for large STOL aircraft that must lift heavy loads from short air fields. As an example, this mechanism has been used to control flaps as long as fifty feet. Further the mechanism permits use of these flaps in high speed swept wing aircraft.

Sideways motion of the flap mechanism is largely eliminated by this flap arrangement as compared to conventional assemblies. Referring once again to FIG. 1 it can be seen that the flap 12 moves proportionally away from wing 10. Since the flap varies in width due to the swept wing configuration, flap rotation could cause sideway movement of the mechanisms in fairings 28, as they to compensate for the proportional movement of the flap. In this invention, spherical bearing mounts at the actuator pivot points compensate for this sideways motion. As a result of this simplified mechanism, the misaligned linkage problem common to conventional mechanisms is overcome. In contrast, multiple bracket mechanisms which are relatively loose accept the sideway motion between the links. As a result of this these multilink mechanisms cannot be tightly controlled with track and roller assemblies without jamming of the mechanism.

The improved rigidity of the mechanism of this invention not only permits the use of control tracks and rollers, it also reduces chafing and wear at link connections. This increases the time between overhaul and replacement.

While the invention has been particularly described with reference to the preferred embodiment thereof, it will be understood by those skilled in the art the various changes in substance and form can be made therein without departing from the spirit and scope of the invention as detailed in the appended claims. For example, this flap system should not be limited in its application to STOL aircraft since many of its features and virtues are fully translatable to general usage aircraft that may from time to time need to land at shortened airfields or in the minimum distance during inclement weather.

I claim:

1. A flap system for an aircraft comprising:
   (a) an aircraft wing having a trailing edge;
   (b) a flap support fixedly mounted to the trailing edge of said wing;
   (c) a wing flap having inboard and outboard ends and a fixedly attached flap mounting bracket which is pivotably mounted at a single pivot point to said flap support;
   (d) a flap linear actuator pivotably attached directly to said flap support and directly attached to said wing flap mounting bracket for adjusting flap position relative to the aircraft wing;
   (e) a single vane fixedly attached to said wing flap for coordinated movement therewith;
   (f) a spoiler pivotably attached to said flap support;
   (g) a spoiler linear actuator pivotably attached to said spoiler for independent spoiler actuation; and
   (h) a link member pivotably connected directly to said flap mounting bracket and to a crank arm which is connected to said spoiler actuator for coordinating spoiler movement with flap movement in order to provide a double slotted flap system for increased lift.

2. The flap system of claim 1 further comprising a crank member connecting said link and said spoiler actuator for proportionating spoiler movement with flap movement.

3. The flap system of claim 1 further comprising a track and roller assembly interposed between said flap and said aircraft wing for controlling flap motion.

4. The flap system of claim 3 wherein said track and roller assembly comprises an inboard track assembled to the inboard end of said wing flap and an inboard roller assembly attached to said wing end, said roller assembly fitted to roll within said track during movement of said wing flap.

5. The flap system of claim 4 wherein said track and roller assembly further comprises an outboard track assembled to the outboard end of said wing flap and an outboard roller assembly attached to said wing and fitted to roll within said track during movement of said wing flap.

6. The flap system of claim 3 wherein said track and roller assembly further comprises an outboard track assembled to the outboard end of said wing flap and an outboard roller assembly attached to said wing and fitted to roll within said track during movement of said wing flap.

7. The flap system of claim 5 wherein said roller assemblies are mounted to said wing by means of spherical mountings that insure that said roller assemblies are aligned with their respective tracks.

8. The flap system of claim 1 wherein said vane and said wing flap define a flow directing passage which serves to increase lift during aircraft take-offs and landings by increasing airflow over said wing and said flap.

9. The flap system of claim 5 wherein said aircraft wing is swept back in relation to an aircraft fuselage.

10. The flap system of claim 1 wherein said flap actuator further comprises spherical bearings at its attachment points with said wing flap and said flap support.

11. The flap system of claim 1 wherein said vane provides, in conjunction with said spoiler and said wing flap, two flow directing passages when said flap is in an extended position, said passages providing increase lift for said aircraft.

12. A flap system for an aircraft comprising:
 (a) an aircraft wing having a trailing edge;
 (b) a flap hinge bracket fixedly mounted to the trailing edge of said wing;
 (c) a wing flap having an inboard and an outboard end and a flap mounting bracket fixedly attached, said wing flap mounting bracket pivotably mounted at single points pivots to said flap hinge bracket;
 (d) a flap linear actuator pivotably attached directly to said aircraft wing and to said wing flap mounting bracket for selectively extending said flap from said aircraft wing, said flap actuator attached to said wing flap mounting bracket by a spherical mounting in a clevis joint;
 (e) a spoiler pivotably attached to said aircraft wing;
 (f) a spoiler linear actuator pivotably attached to said spoiler for extending said spoiler above the aircraft wing; and
 (g) a link member pivotably connected to said flap and said spoiler actuator for coordinating movement of said spoiler with said flap as directed by said flap actuator in order to provide a double slotted flap system for increased lift during aircraft landing and takeoff maneuvers.

13. The flap system of claim 12 further comprising a vane mounted adjacent to said wing flap for providing additional lift during aircraft landings and ascents.

14. The flap system of claim 12 further comprising a crank member connecting said link and said spoiler actuator for proportionating spoiler movement with flap movement.

15. The flap system of claim 12 wherein said spoiler is pivotably attached to said flap hinge bracket.

16. The flap system of claim 14 wherein said vane provides, in conjunction with said spoiler and said wing flap, two flow directing passages when said flap is in an extended position, said passages providing increased lift for the aircraft.

17. The flap system of claim 12 wherein said flap actuator further comprises spherical bearings at its attachment points with said wing flap and said flap support.

* * * * *